Patented Dec. 13, 1938

2,140,215

UNITED STATES PATENT OFFICE 2,140,215

PROCESS FOR MAKING CUTTING-OIL COMPOUNDS

John E. Wilkey, Lyndhurst, Ohio, assignor to Sea Gull Lubricants, Inc., Cleveland, Ohio, a corporation of Ohio No Drawing. Application July 2, 1936, Serial No. 88,688

10 Claims. (Cl. 87—9)

This invention relates to a cutting compound or fluid adapted to cool metal cutting tools and facilitate their cutting action. The present invention is especially concerned with a cutting oil or compound which utilizes, as a base, a mineral oil or a combination of mineral, animal, vegetable, or other fixed oils.

In the past cutting oils or compounds have, for the most part, been made from vegetable or animal oils, of which the most generally used is lard oil. Sulphur has been added to these oils to increase their cutting quality or adhesiveness. However such oils are expensive.

Some few attempts have been made to utilize as a base for such cutting fluids, a mineral oil such as, for instance, ordinary petroleum oil of a naphthenic base, such oils being much less expensive than the animal or vegetable oils heretofore used.

It has been found exceedingly difficult to add sulphur to mineral oils and prevent at least a great percentage of the sulphur from settling out before the consumer can utilize the oil. In certain instances the comparatively small amount of sulphur present in the final product has been the result of the addition of a much greater amount of sulphur to a mineral oil in the presence of heat, however such products have much less sulphur than is desired and even such amount is difficult to maintain for any period of time. Such oils also have objectional odors which together with the fact that only a small percentage of the sulphur added to the oil remains in stable chemical combination therewith following a comparatively short settling period renders these oils unfit for practical use as cutting fluids.

The general object of the present invention is to provide an economical cutting oil and a method of producing the same. A more specific object is to provide a method of producing a cutting oil from a mineral oil base, which will result in the provision of an improved cutting oil having a comparatively large amount of sulphur in loose chemical combination therewith and which oil will be free from obnoxious and objectionable odors, thus producing an economical and practical cutting fluid.

Other objects of the present invention will become more apparent from the following description and the specific example set forth therein. The essential and novel characteristics of my improved cutting oil and the improved process for making the same will be more fully set forth in the claims.

In general my improved process comprises the use of a mineral oil, or a combination of mineral, animal and vegetable oils as a base. In this base I mix dry flowers of sulphur (palpated) in substantially the quantity desired in the final product. This mixture is then heated to melt the sulphur in the oil. Whereupon dry chlorine gas is passed through the mixture, and the mixture then allowed to cool. The sulphur is then stabilized by reheating the mixture and the excess chlorine removed by passing air through the heated mixture.

More specifically in carrying out my invention I take any desired quantity of mineral oil, of any available gravity, viscosity and from any field. The oil is placed in a suitable container and substantially the quantity of sulphur desired in the resultant product is added in the form of dry flowers of sulphur (palpated). For example, I may take 2.61 pounds of naphthenic base mineral oil having a specific gravity of 0.9111 or a Baumé of 25.7. If the resultant product is to contain 3.98% sulphur, 3.58% by weight, or 1.49 ounces, of flowers of sulphur is mixed with the oil.

This mixture of sulphur and oil is then heated to 290 degrees Fahrenheit and is stirred to melt the sulphur in the oil. Whereupon a volume of dry chlorine gas is passed through the heated mixture. In the specific example given such gas may be made from 1.82 ounces of manganese dioxide and 6.8 ounces of hydrochloric acid, having a specific gravity of 1.18. This gas causes a chemical action to take place. The oil is transformed under the influence of the chlorine gas from a light-red transparent solution, to a jet black liquid.

This black liquid is then allowed to cool to approximately 85 degrees Fahrenheit, whereupon I find that a partial separation of the constituents takes place. To prevent the sulphur from settling out of the final product I reheat this liquid to a temperature of about 350 degrees Fahrenheit and maintain it at this temperature and under constant agitation for about fifteen minutes. This agitation is generally sufficient to cause a quantity of air to be passed through the mixture. In certain instances it has been found advantageous to mechanically pass a quantity of air through the liquid during such agitation. This reheating causes the sulphur and chlorine to further react with the oil to form a stable compound, while the air causes the liberation of the excess chlorine.

The heated liquid is then transferred to a tin lined container and allowed to cool for approximately 111½ hours, although actual experience shows that in most instances this time may be decreased considerably without any disadvantageous effect on the results. After the liquid has cooled it is filtered to remove all precipitated sludge.

By experiment I have found the precipitated sludge which is removed by the filtering process amounts to about 0.36% of the original oil. The residue does not comprise sulphur as might be expected, but comprises mainly oxidized hydrocarbons.

The filtered oil is a heavy, black, opaque liquid, possessing an agreeable odor and has altogether different physical and chemical properties than the original oil. For instance, in the specific example above set forth the specific gravity of the finished oil is approximately 0.9242, or 22.6 Baumé at 60 degrees Fahrenheit and contains 3.687% sulphur, hence it is obvious that the sulphur does not precipitate out in the sludge, nor is it removed in the filtering process.

Likewise when a strip of polished copper is immersed in the finished product for approximately thirty seconds and then withdrawn and rinsed with neutral naphtha, the immersed surface of the copper is blackened with copper sulphide to such an extent that identification of the metal is impossible.

By my improved process I lower the cold test of the oil, increase the viscosity of the oil, increase the film strength of the oil, and provide an oil having a comparatively great amount of sulphur in loose chemical combination therewith, which sulphur will remain in such combination over extended periods of time.

In the specific example given, I have specified certain definite proportions, however it is obvious that the proportions may be varied and the amounts increased without departing from the spirit of the invention. It is to be understood that one of the important features of my invention is the mixing of a mineral oil with sulphur in the presence of heat, allowing the mixture to cool and subsequently reheating the mixture to a higher temperature than that used during the mixing operation to thereby make the combination substantially permanent.

I claim:

1. The method of preparing a cutting oil compound which comprises heating a mixture of mineral oil and sulphur to 290 degrees Fahrenheit, cooling the heated mixture, reheating the cooled mixture to 350 degrees Fahrenheit and maintaining the mixture at such temperature for substantially fifteen minutes.

2. The method of preparing a cutting oil compound which comprises heating a mixture of mineral oil and sulphur to 290 degrees Farhenheit, passing chlorine gas through the mixture, cooling the mixture, reheating the mixture to 350 degrees Fahrenheit, and passing air through the mixture to remove the excess chlorine.

3. The method of preparing a cutting oil which comprises heating a mixture of mineral oil and sulphur to melt the sulphur in the mineral oil, passing chlorine gas through the heated mixture, cooling the mixture, bringing the mixture to a temperature substantially 60 degrees higher than the first named heating, passing air through the mixture to eliminate the excess chlorine, cooling the mixture to normal temperature, and subsequently filtering the cooled liquid to remove the sludges formed during the treating step.

4. The process of producing a cutting oil comprising mixing a quantity of mineral oil with substantially 3.68% by weight of sulphur, heating the mixture to a temperature of substantially 290 degrees Fahrenheit with continuous stirring, passing a chlorine gas through the mixture, cooling to substantially 85 degrees Fahrenheit, reheating the cooled mixture to substantially 350 degrees Fahrenheit and maintaining the mixture at said last named temperature to cause the sulphur and chlorine to react with the oil to form a loose chemical compound, passing air through said heated mixture to liberate the excess chlorine, cooling the mixture to atmospheric temperature, and filtering the cooled liquid to remove any precipitated sludge.

5. The method of preparing a cutting oil comprising mixing an oil containing a mineral oil with sulphur, heating the mixture at a temperature which will melt the sulphur in the oil, cooling the heated mixture, and subsequently reheating the mixture at a temperature sufficient to effect a reaction between the oil and sulphur, thereby forming a stable compound which will maintain the sulphur in combination with the oil.

6. The method of preparing a cutting oil comprising mixing a mineral oil and sulphur, heating the mixture at a temperature which will melt the sulphur in the oil, cooling the mixture, subsequently reheating the mixture to a temperature sufficiently higher than the first-named temperature to effect a reaction between the oil and sulphur to thereby stabilize the compound, and finally bringing the mixture to normal atmospheric temperature.

7. The method of preparing a cutting oil comprising mixing a mineral oil with sulphur in the presence of sufficient heat to melt the sulphur in the oil, treating the heated mixture with chlorine gas, and subsequently removing the excess gas, and reheating the mixture to a temperature sufficiently higher than that required to melt the sulphur to effect a reaction between the oil and sulphur and thereby stabilize the compound.

8. The method of preparing a cutting oil comprising mixing a mineral oil with sulphur, heating the mixture at a temperature which will melt the sulphur in the oil, treating the mixture with chlorine gas, cooling the treated mixture, reheating the cooled mixture to a temperature sufficiently high to effect a reaction between the oil and sulphur and thereby stabilize the compound, removing the excess chlorine, and finally cooling the mixture to a normal atmospheric temperature.

9. The method of preparing a cutting oil comprising mixing a mineral oil with sulphur, heating the mixture at a temperature which will melt the sulphur in the oil, treating the mixture with chlorine gas, cooling the treated mixture, reheating the cooled mixture to a temperature sufficiently high to effect a reaction between the sulphur and oil to thereby stabilize the mixture, agitating the reheated mixture to remove the excess chlorine, and thereafter cooling the mixture to normal atmospheric temperature.

10. The method of preparing a cutting oil comprising mixing a mineral oil with sulphur, heating the mixture to a temperature which will melt the sulphur in the oil, treating the mixture with chlorine gas, cooling the treated mixture, reheating the cooled mixture to a temperature sufficiently high to effect a reaction between the sulphur and oil to thereby stabilize the mixture, passing air through the heated mixture to remove the excess chlorine, and thereafter cooling the mixture to normal atmospheric temperature.

JOHN E. WILKEY.